Patented Sept. 22, 1936

2,054,834

UNITED STATES PATENT OFFICE 2,054,834

METHOD FOR THE PRODUCTION OF HYDROGENATED ROSIN AND ABIETIC ACID AND HYDROGENATED METAL SALTS OF ROSIN AND ABIETIC ACID

Ebenezer Emmet Reid, Baltimore, Md., assignor to Hercules Powder Company, Wilmington, Del., a corporation of Delaware No Drawing. Application June 14, 1932, Serial No. 617,256. Renewed November 27, 1934

20 Claims. (Cl. 260—108)

This invention relates to the production of hydrogenated rosin and hydrogenated metal salts of rosin.

Heretofore it has been known to effect hydrogenation of rosin such as gum rosin and wood rosin, or of abietic acid, the principal component of rosin, with the aid of a catalyst. Catalysts such as platinum, palladium, etc. oxides have been used, as have also base metal catalysts. In prior methods where base metal catalysts are used a partial combination of the catalyst with the abietic acid has been noted, as a result of which the effectiveness of the catalyst is diminished and a loss of catalyst results from the formation of a hydrogenated rosin containing metal salts. The presence of metal salts in the hydrogenated rosin product is objectionable for most uses of the product.

Now, it is the object of this invention to provide a method whereby hydrogenated rosin or abietic acid may be produced with the use of a base metal catalyst, but which, however, will be free from metal salts and with the practice of which the effectiveness of the catalyst will not be diminished by the partial combination with the abietic acid heretofore noted and with consequent avoidance of loss of catalyst.

Further, the method the object of this invention provides procedure whereby hydrogenated metal salts of rosin or abietic acid may be readily and simply produced. The method embodying this invention from a broad standpoint involves first neutralizing rosin or abietic acid to be hydrogenated with a suitable alkali or alkali earth and then hydrogenating the neutralized rosin or abietic acid. Where the product desired is a hydrogenated metal salt of rosin, such is produced directly by the above outlined procedure. Where the product desired is hydrogenated rosin or abietic acid the alkali metal salt of rosin or abietic acid after hydrogenation is subjected to acidification to free the abietic acid and the hydrogenated rosin or abietic acid extracted by any suitable means.

In the practical adaptation of the method in accordance with this invention the neutralization of the rosin or abietic acid with an alkali or alkali earth may be effected in any suitable manner and with the use of any suitable desired alkali. The hydrogenation is accomplished in any suitable manner, as by heating the neutralized rosin or abietic acid with a base metal hydrogenation catalyst in the presence of hydrogen. The hydrogenation is preferably carried out under pressure with agitation. Neutralized rosin or abietic acid may be subjected to hydrogenation in a molten condition or, as may be preferable due to the high melting point of the neutralized rosin or abietic acid, the neutralized rosin or abietic acid may be subjected to hydrogenation in solution in a suitable solvent.

As has been indicated, any suitable alkali or alkali earth may be used for neutralizing the rosin. The rosin may, as has been indicated, be either gum or wood rosin and may be of any grade and may have been subjected to previous treatment for its refinement. As illustrative of alkalies and alkali earths which may be used for neutralizing the rosin or abietic acid, for example, the hydroxide or carbonate of an alkali metal, such as sodium hydroxide, potassium hydroxide, sodium carbonate, sodium bicarbonate, etc., etc. may be used, or the oxide or hydroxide of alkaline earth metal, such as calcium hydroxide, barium oxide, magnesium oxide, etc., etc. may be used. Neutralization of the rosin or abietic acid may be accomplished in any suitable manner and it will be understood that the rosin will be neutralized or at least substantially neutralized.

Any suitable base metal hydrogenation catalyst may be used, such, for example, as a reduced oxide of nickel, copper, cobalt, chromium, etc., etc. or mixtures thereof. The catalyst may be used supported or unsupported and where supported may be supported on, for example, kieselguhr, pumice, silica gel, etc., etc.

As has been indicated, the hydrogenation of the neutralized rosin or abietic acid may be carried out with the resinate in a molten condition. However, as has been indicated, due to the high melting point of the resinate, it may be desirable to proceed with the resinate in solution in a suitable solvent. As illustrative of a suitable solvent, for example, where sodium or potassium resinate is hydrogenated, such may be hydrogenated, for example, in solution in water, ethyl alcohol, methanol, etc., etc., or mixtures thereof. Where proceeding with, for example, calcium resinate, such may be hydrogenated, for example, in solution in benzene, mineral spirits, etc., etc.

In effecting the hydrogenation of the neutralized rosin or abietic acid the conditions may be widely varied. However, as has been indicated, the procedure will be desirably under pressure and may, for example, be conducted at a pressure ranging up to say about 400 atmospheres. Preferably the pressure will be within the range of say about 30–100 atmospheres. The hydrogenation is carried out in the presence of heat. The temperature used may vary widely, depending upon the particular resinate treated and upon the other conditions, as temperature, etc. The temperature may, for example, be within the range say about 125–225° C., and may desirably be within, for example, the range about 150–185° C.

The catalyst may be used in widely varying amounts, depending upon the activity of the particular catalyst chosen, the degree of hydrogenation desired and the conditions under which the hydrogenation is effected as, for example, temperature, pressure, etc. The catalyst may, for example, be used in amount say from about 0.2–10%, though usually an amount of catalyst within about the range 0.5–3.0% will be found sufficient. The procedure leading to the neutralization or substantial neutralization of the rosin or abietic acid may be carried out with the alkali selected in any suitable manner and in any suitable form of apparatus. Hydrogenation of the neutralized or substantially neutralized rosin or abietic acid may be carried out following any usual modus operandi for hydrogenation and in any suitable form of apparatus with consideration for providing a suitable temperature and pressure. The hydrogen may, for example, be bubbled through thet molten resinate or solution of resinate as the case may be with the catalyst in admixture therewith, under suitable conditions of temperature and pressure. Agitation may be provided by any suitable agitating means.

Where it is desired that the product be hydrogenated, rosin or abietic acid, as compared with a hydrogenated metal salt thereof, the metal salt, after absorption of hydrogen has been completed, or absorption has been effected to the desired point will be decomposed to free the abietic acid, for example, by acidification with dilute acid, as acetic, hydrochloric, sulphuric, etc. and the hydrogenated abietic acid then extracted with a water-immiscible solvent therefor, as for example, gasoline, mineral spirits, benzene, toluene, etc., etc. The hydrogenated rosin or abietic acid, after extraction with a suitable solvent is finally recovered by evaporation off of the acid.

As illustrative of a practical adaptation of this invention, for example, 100 parts of sodium resinate in solution are produced by the treatment of, for example, wood rosin with sodium hydroxide which is dissolved in a mixture of 50 parts of methanol and 50 parts of water. To the solution of sodium resinate is added say about 2% of powdered nickel hydrogenation catalyst and the mixture heated in an atmosphere of hydrogen to a temperature of say about 160° C. under a pressure of about 1500 pounds per square inch, for a period of about one hour. As a result of the hydrogenation treatment one double bond of the sodium resinate will become approximately 80% saturated with hydrogen. After completion of the hydrogenation the solution is cooled, diluted with methanol and filtered from the catalyst. The product so far will constitute a hydrogenated sodium resinate. Where hydrogenated rosin or abietic acid as such is desired, the solution of hydrogenated sodium resinate, after filtering out of the catalyst, is acidified with dilute sulphuric acid, which results in decomposition of the resinate and freeing of hydrogenated abietic acid. The hydrogenated abietic acid is then recovered by extraction with, for example, mineral spirits.

As a further illustration, for example, 100 parts of sodium resinate formed into a thick paste with about 50% of water is subjected to hydrogenation under conditions of temperature and pressure such as are given in the above example. On completion of the hydrogenation a large volume of water is added to the paste after cooling and the catalyst filtered off. Where the hydrogenated rosin or abietic acid as such is desired, the solution is acidified after filtration out of the catalyst and the hydrogenated rosin or abietic acid recovered by extraction with a suitable solvent such as, for example, benzene or gasoline, which is immiscible with water.

The hydrogenated rosin or abietic acid product produced in accordance with this invention finds various use in the commercial arts and is possessed of the very distinct advantage in that it is not contaminated by the presence of metal salts such as have heretofore been found to contaminate hydrogenated rosin or abietic acid where hydrogenated as such in the presence of a base metal catalyst. The hydrogenated metal salts of rosin or abietic acid produced in accordance with this invention likewise find various use in the commercial arts. Thus, for example, the hydrogenated sodium salt may be used in the sizing of paper, in the preparation of laundry soaps, etc.

What I claim and desire to protect by Letters Patent is:

1. The method of hydrogenating abietic acid, which includes substantially neutralizing abietic acid and effecting hydrogenation of the substantially neutralized abietic acid.

2. The method of hydrogenating abietic acid, which includes substantially neutralizing abietic acid and effecting hydrogenation of the substantially neutralized abietic acid in the presence of a hydrogenation catalyst.

3. The method of hydrogenating abietic acid, which includes substantially neutralizing abietic acid and effecting hydrogenation of the substantially neutralized abietic acid by heating the neutralized abietic acid at a temperature which will promote hydrogenation and under superatmospheric pressure and in the presence of a base metal hydrogenation catalyst.

4. The method of hydrogenating abietic acid which includes reacting abietic acid with an alkali to produce a resinate, hydrogenating the resinate and decomposing the resinate to free the hydrogenated abietic acid.

5. The method of hydrogenating abietic acid, which includes neutralizing rosin with an alkali, hydrogenating the neutralized rosin at a temperature within about the range 125–225° C. and under a pressure within about the range 30–100 atmospheres in the presence of a base metal hydrogenation catalyst.

6. The method of hydrogenating abietic acid, which includes neutralizing rosin with an alkali, hydrogenating the neutralized rosin at a temperature within about the range 125–225° C. and under a pressure within about the range 30–100 atmospheres in the presence of from about 0.2–10% of a base metal hydrogenation catalyst.

7. The method of hydrogenating abietic acid which includes treating abietic acid to form a metal resinate and hydrogenating the metal resinate.

8. The method of hydrogenating abietic acid which includes treating abietic acid to form a metal resinate and hydrogenating the metal resinate in the presence of a hydrogenation catalyst.

9. The method of hydrogenating abietic acid which includes treating abietic acid to form a metal resinate and hydrogenating the metal resinate by heating the metal resinate at a temperature which will promote hydrogenation, under superatmospheric pressure and in the presence of a base metal hydrogenation catalyst.

10. The method of hydrogenating abietic acid which includes treating abietic acid to form metal resinate, hydrogenating the metal resinate in solution in a solvent, decomposing the hydrogenated metal resinate to free hydrogenated abietic acid and extracting hydrogenated abietic acid from the solution.

11. The method of hydrogenating abietic acid which includes treating abietic acid to form a metal resinate, hydrogenating the metal resinate in solution in a solvent, acidifying the solution to free hydrogenated abietic acid and extracting hydrogenated abietic acid from the solution.

12. The method of hydrogenating abietic acid which includes treating abietic acid to form metal resinate and hydrogenating the metal resinate under a hydrogen pressure of 30–400 atmospheres in the presence of a hydrogenation catalyst.

13. The method of hydrogenating rosin which includes treating rosin to form metal resinate and hydrogenating the metal resinate at a temperature which will promote hydrogenation in an atmosphere of hydrogen under a pressure of 30–400 atmospheres in the presence of a hydrogenation catalyst.

14. The method of hydrogenating rosin which includes treating rosin to form metal resinate and hydrogenating the metal resinate at a temperature which will promote hydrogenation in solution in a solvent in an atmosphere of hydrogen under a pressure of 30–400 atmospheres in the presence of a hydrogenation catalyst, acidifying the hydrogenated resinate to free hydrogenated resin acid and extracting hydrogenated resin acid from the solution.

15. The method of hydrogenating rosin which includes treating rosin to form metal resinate and hydrogenating the metal resinate at a temperature which will promote hydrogenation in solution in a solvent in an atmosphere of hydrogen under a pressure of 30–400 atmospheres in the presence of a hydrogenation catalyst.

16. The method of hydrogenating rosin which includes treating rosin to form an alkali resinate and hydrogenating the alkali resinate in solution in a solvent in an atmosphere of hydrogen at a temperature which will promote hydrogenation under a pressure of 30–400 atmospheres in the presence of a hydrogenation catalyst, acidifying the hydrogenated resinate to free hydrogenated resin acid and extracting hydrogenated resin acid from the solution.

17. The method of hydrogenating rosin which includes treating rosin to form a sodium resinate and hydrogenating the sodium resinate in solution in a solvent in an atmosphere of hydrogen at a temperature which will promote hydrogenation under a pressure of 30–400 atmospheres in the presence of a hydrogenation catalyst, acidifying the hydrogenated resinate to free hydrogenated resin acid and extracting hydrogenated resin acid from the solution.

18. The method of hydrogenating rosin, which includes substantially neutralizing rosin and effecting hydrogenation of the substantially neutralized rosin by heating the neutralized rosin at a temperature which will promote hydrogenation under superatmospheric pressure and in the presence of a hydrogenation catalyst.

19. The method of hydrogenating rosin, which includes treating rosin to form a metal resinate effecting hydrogenation of the metal resinate in solution in a solvent in an atmosphere of hydrogen under a pressure of 30–400 atmospheres in the presence of a base metal hydrogenation catalyst.

20. The method of hydrogenating rosin, which includes treating rosin to form an alkali resinate and hydrogenating the alkali resinate in solution in a solvent at a temperature within about the range 125–225° C. in an atmosphere of hydrogen under a pressure of 30–400 atmospheres in the presence of a base metal hydrogenation catalyst.

EBENEZER EMMET REID.